Feb. 28, 1961     H. Y. LEE     2,972,903
SECTIONAL GEARING WITH LUBRICATING MEANS THEREFOR
Filed Nov. 12, 1958     2 Sheets-Sheet 1
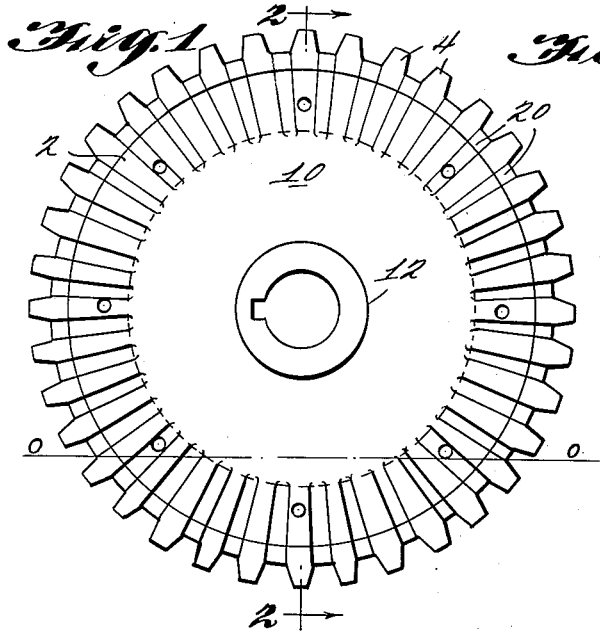
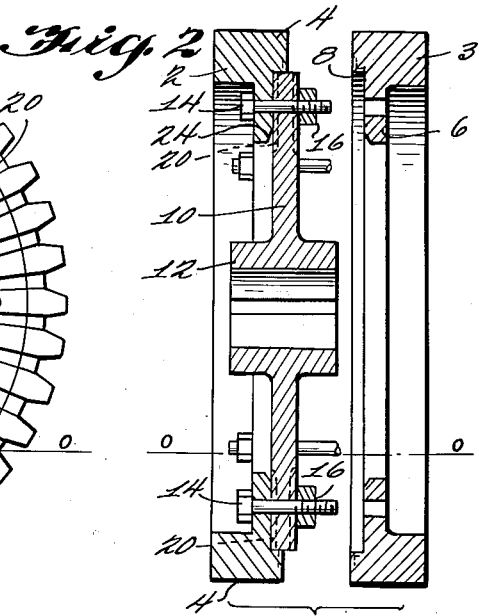
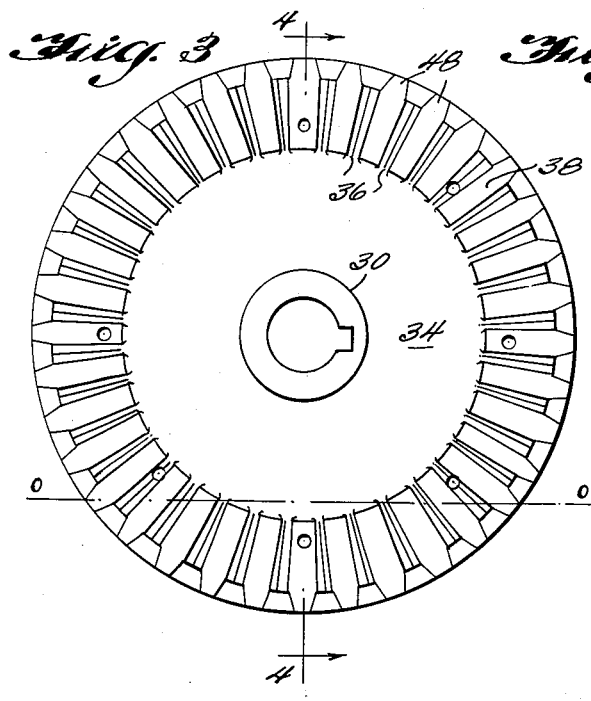
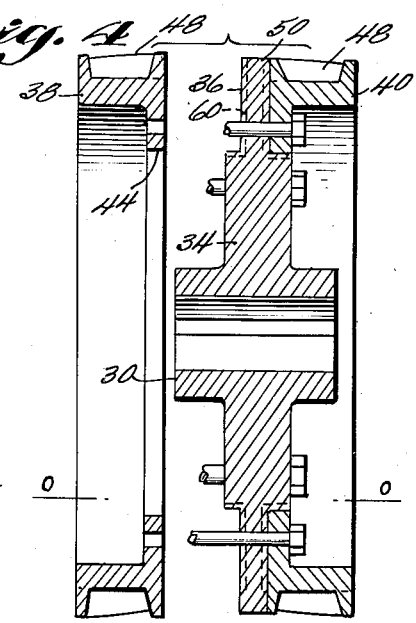
INVENTOR
*HENRY Y. LEE*
BY *Robert U. Geib, Jr.*
ATTORNEY Feb. 28, 1961 H. Y. LEE 2,972,903
SECTIONAL GEARING WITH LUBRICATING MEANS THEREFOR
Filed Nov. 12, 1958 2 Sheets-Sheet 2
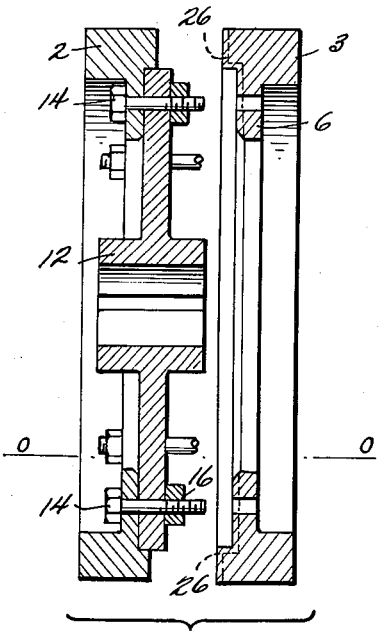
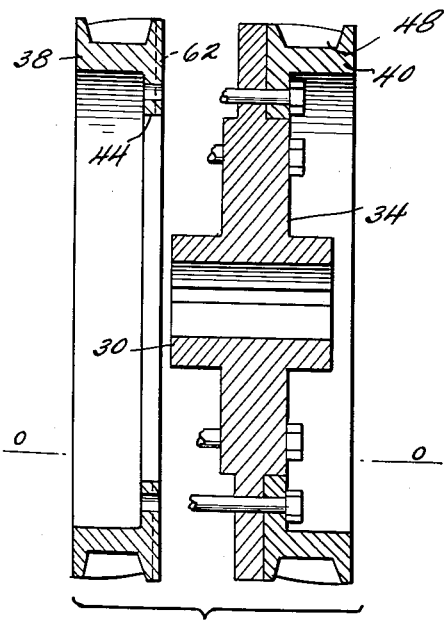
INVENTOR
HENRY Y. LEE
BY Robert U. Geil, Jr.
ATTORNEY

United States Patent Office 2,972,903
Patented Feb. 28, 1961

2,972,903

SECTIONAL GEARING WITH LUBRICATING MEANS THEREFOR

Henry Y. Lee, 3718 Manini Way, Honolulu 16, Hawaii

Filed Nov. 12, 1958, Ser. No. 773,315

3 Claims. (Cl. 74—468)

The present invention relates to sectional gearing with lubricating means therefor, the teachings thereof being applicable to peripherally toothed gears of various types, including spur, helical and herringbone.

In my Patent Nos. 2,748,618, and 2,859,635 which issued on June 5, 1956, and November 11, 1958, respectively, several types of peripherally toothed sectional gears are disclosed, the sections thereof being ring-like and held together in such manner as to provide a highly efficient unitary construction, the various elements of which may, if desired, be quickly and inexpensively replaced.

It is, of course, well known that all gearing, including the types disclosed and claimed in said patents, is susceptible to damage due to inadequate lubrication which results in heat generation and excessive friction, and, ultimately, crystallization and fracture of the gear teeth.

Accordingly, it is among the objects of the present invention to provide sectional gears of the types referred to which are characterized by possessing means for effectively lubricating their peripheral teeth prior to their engagement in train.

Another object is the provision, in a sectional gear of the type comprising a pair of cooperative peripherally-toothed circular bands in side-by-side relationship, of novel and highly efficient lubricating means which may be simply and inexpensively produced immediately following the manufacture of the gear components themselves.

The invention, then, comprises the features hereinafter fully described and as particularly pointed out in the claims, the following description and annexed drawings setting forth in detail certain illustrative embodiments of the invention, these being indicative of several ways in which the principles of the invention may be employed.

In said drawings:

Figure 1 is a side elevational view of one type of sectional gear which embodies the teachings of the present invention;

Figure 2 is a cross-sectional view of the sectional gear of Figure 1, the same being taken on the line 2—2 thereof;

Figure 3 is a view similar to that of Figure 1, but illustrating a different type of gear (e.g., pug-nose herringbone);

Figure 4 is a sectional view taken on the line 4—4 of Figure 3;

Figure 5 is a sectional elevation showing a modified means for lubricating the periphery of a sectional gear of the type which is illustrated in Figure 2; and Figure 6 is a vertical section illustrating a modified means for lubricating the periphery of a sectional gear of the type which is shown in Figure 4.

Referring more particularly to Figure 2 of the drawings, the numerals 2 and 3 designate a pair of gear bands, the peripheries of which are provided with teeth 4 which align in such manner as to collectively provide the desired tooth-pattern, whether it be spur, helical, herringbone, etc.

Each of the ring-like gear bands 2 and 3 is provided adjacent its inner wall with a comparatively short integrally-formed flange 6 which extends inwardly toward its axis of rotation. In addition, the inner face of each of the ring-like gear bands 2 and 3, and the adjacent surface of its integrally-formed flange 6, is machined to provide an annular L-shaped recess 8.

According to the embodiment described immediately hereinbefore, the two cooperating gear bands 2 and 3, each with its L-shaped annular recess 8, are assembled with an intermediately disposed web member 10, the latter being provided with a shaft-receiving hub 12 of conventional design. More specifically, the web 10 is plate-like in form and of such thickness as will permit its periphery and the outer portions of its side faces to snugly seat against the adjacent surfaces of the complementarily formed L-shaped annular recesses 8 of the gear bands 2 and 3. Preferably, those portions of the web member 10 which come into contact with the machined L-shaped recesses 8 and the gear bands 2 and 3 are likewise machine-finished.

The gear bands 2 and 3 and the intermediately disposed plate-like web member 10 may be firmly, but detachably, united by bolts 14 which extend therethrough and which are provided with suitably locked nuts 16.

According to the teachings of the present invention, the self-lubricating means contemplates the provision on the outer, and machine finished, portions of the side faces of the plate-like web 10 of a series of radially disposed oil-receiving grooves 20 which communicate with the peripheral teeth 4 of the gear bands 2 and 3, the said grooves extending inwardly toward the hub 12 to a point which enables communication with the inner circumference of the adjacent flange 6. If desired, the inner circumferential edges of the flanges 6 may be chamfered as shown at 24 to provide increased access of the oil to the inner ends of the oil-receiving grooves 20.

In Figures 3 and 4, the teachings of the present invention are illustrated as being applied to a sectional gear of the pug-nose herringbone type. More specifically, a hub 30 is provided with a web 34 of substantial thickness, the outer portions of the side faces of said web being machined to provide a pair of oppositely disposed L-shaped annular recesses 36 in back-to-back relationship. According to this embodiment, there is provided a pair of peripherally-toothed gear bands 38 and 40, each of which carries a comparatively short integrally-formed flange 44 which extends inwardly toward its axis of rotation. However, the inner faces of the inwardly extending flanges 44 of the gear bands 38 and 40 are machined flush; and they are of such size and shape as to permit them to snugly occupy the L-shaped machine-finished annular recesses 36 with their peripheries coextensive with the periphery of the web 34 which is provided with teeth 50 of the spur type.

The teeth 48 on the peripheries of the gear bands 38 and 40 are of the oblique or helical type and are adapted to align with the straight or spur teeth 50 on the periphery of the web 34, thereby forming a composite gear of the pug-nose herringbone type.

As in the manner of the embodiment illustrated in Figures 1 and 2, the gear bands 38 and 40, and that portion of the web which is disposed therebetween, may be firmly, but detachably, united by bolts 14 which extend therethrough, and which are provided with suitably locked nuts 15.

In the embodiment of Figures 3 and 4, the self-lubricating means comprises the provision on the L-shaped annular recesses 36 of the web 34 of a series of radially disposed oil-receiving grooves 60 which communicate with the peripheral teeth of the gear bands 38 and 40. The inner ends of these oil-receiving grooves 60 are shown as being extended at right-angles along the foot portion of each of the L-shaped annular recesses 36.

In Figure 5 of the drawings, there is illustrated a form of the present invention which is of the same general type as that which is illustrated in Figures 1 and 2, but wherein the radially extending oil-receiving grooves 26 are cut into the inner face of the flanges 6 of the gear bands 3 and 4, in lieu of the oil-receiving grooves 20 in the web 10.

In Figure 6, a further modification is shown as comprising a series of radially extending oil-receiving grooves 62 in the inner faces of the flanges 14 of the gear bands 38 and 40.

It will, of course, be understood that the radially extending oil-receiving grooves may be partially in the web and partially in the flanges of the gear bands. Alternatively, the oil-receiving grooves may be entirely within either the web or the flange on one side of a single sectional gear with a directly opposite situation on the other side thereof.

In each of the embodiments set forth herein, the oil level within the gear housing is indicated by the dotted line O—O; and as long as it is maintained at a level which is above the inner ends of the radially extending capillary conduits when the same are in their lowermost positions, the oil will enter the capillary conduits; and, as the gear rotates, oil will be picked up and effectively distributed to the surfaces of the gear teeth by means of the capillary and centrifugal actions of the sectional elements by and between which the said conduits are formed.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. In a sectional gear of the type comprising a pair of cooperative peripherally-toothed circular bands in side-by-side relationship; a flange carried by each of said gear bands and extending inwardly toward the axis thereof; an annular member disposed intermediately of, and in contact with, the flanges carried by said gear bands; screw-threaded means for detachably securing said flanges to said annular member; and a series of generally radially extending oil conduits formed by and between said annular member and the flange carried by one of said gear bands; said oil conduits providing communication between the toothed periphery of said last-mentioned gear band and the inner periphery of the flange which is carried thereby.

2. In a sectional gear of the type comprising a pair of cooperative peripherally-toothed circular bands in side-by-side relationship; a flange carried by each of said gear bands and extending inwardly toward the axis thereof; an annular member disposed intermediately of, and in contact with, the flanges carried by said gear bands; screw-threaded means for detachably securing said flanges to said annular member; one of the side faces of said annular member having a series of generally radially extending oil-receiving grooves, the side face of the flange of the most adjacent gear band so cooperating with said oil-receiving grooves as to form oil conduits; said oil conduits providing communication between the toothed periphery of said last-mentioned gear band and the inner periphery of the flange which is carried thereby.

3. In a sectional gear of the type comprising a pair of cooperative peripherally-toothed circular bands in side-by-side relationship; a flange carried by each of said gear bands and extending inwardly toward the axis thereof; an annular member disposed intermediately of, and in contact with, the flanges carried by said gear bands; screw-threaded means for detachably securing said flanges to said annular member; one of the side faces of the flange of one of said gear bands having a series of generally radially extending oil-receiving grooves; the adjacent side face of said annular member so cooperating with said oil-receiving grooves as to form oil conduits; said oil conduits providing communication between the toothed periphery of said last-mentioned gear band and the inner periphery of the flange which is carried thereby.

References Cited in the file of this patent

UNITED STATES PATENTS

| | | |
|---|---|---|
| 1,132,748 | Sundh | Mar. 23, 1915 |
| 1,170,057 | Farnum | Feb. 1, 1916 |
| 1,186,434 | Pierce | June 6, 1916 |
| 2,748,618 | Lee | June 8, 1956 |
| 2,859,635 | Lee | Nov. 11, 1958 |

FOREIGN PATENTS

| | | |
|---|---|---|
| 19,780 | Great Britain | Aug. 24, 1910 |